(12) United States Patent
Zembrodt et al.

(10) Patent No.: US 9,624,123 B2
(45) Date of Patent: Apr. 18, 2017

(54) MULTI-COMPONENT ROTARY SPINNER APPARATUSES SYSTEMS AND METHODS FOR PRODUCING FIBER FROM MOLTEN MATERIAL

(71) Applicant: KNAUF INSULATION, INC., Shelbyville, IN (US)

(72) Inventors: Robert W. Zembrodt, Indianapolis, IN (US); Walter A. Johnson, Columbus, IN (US); Paul Wlodarczyk, Indianapolis, IN (US)

(73) Assignee: Knauf Insulation, Inc., Shelbyville, IN (US)

( * ) Notice: Subject to any disclaimer, the term of this patent is extended or adjusted under 35 U.S.C. 154(b) by 0 days.

(21) Appl. No.: 14/453,906

(22) Filed: Aug. 7, 2014

(65) Prior Publication Data
US 2016/0039707 A1 Feb. 11, 2016

(51) Int. Cl.
*C03B 37/04* (2006.01)

(52) U.S. Cl.
CPC .......... *C03B 37/045* (2013.01); *C03B 37/047* (2013.01); *C03B 37/048* (2013.01)

(58) Field of Classification Search
CPC ...... C03B 37/04; C03B 37/045; C03B 37/047
See application file for complete search history.

(56) References Cited

U.S. PATENT DOCUMENTS

| | | | |
|---|---|---|---|
| 3,026,563 A | 3/1962 | Slayter et al. | |
| 3,077,751 A | 2/1963 | Snow et al. | |
| 3,177,058 A | 4/1965 | Slayter et al. | |
| 3,928,009 A | 12/1975 | Perry | |
| 4,718,930 A | 1/1988 | Gartner et al. | |
| 4,904,290 A | 2/1990 | Gaul et al. | |

(Continued)

FOREIGN PATENT DOCUMENTS

| EP | 0484211 | 5/1992 |
|---|---|---|
| EP | 729920 | 9/1996 |

(Continued)

OTHER PUBLICATIONS

European Patent Office, International Search Report and Written Opinion, PCT/US2015/043946, Knauf Insulation, Inc., Nov. 19, 2015, 13 pgs.

(Continued)

*Primary Examiner* — Angela Ortiz
*Assistant Examiner* — Russell Kemmerle, III
(74) *Attorney, Agent, or Firm* — Taft Stettinius & Hollister LLP

(57) ABSTRACT

Rotary spinner apparatuses, systems and methods for producing fibers from molten materials are disclosed. Certain exemplary embodiments include rotary spinners including a hub, a slinger, an annular member, a retaining member, and a plurality of fasteners. In certain embodiments the hub, the retaining member, and the plurality of fasteners are structured to limit axial movement of the annular member relative to the hub member and to allow radial expansion and contraction of the annular member relative to the hub member. In certain embodiments the annular member is structured to contact the hub at a plurality of contact areas and is spaced apart from the hub at a plurality of gap areas. In certain embodiments the slinger is structured to contact the hub at a plurality of contact areas and is spaced apart from the hub at a plurality of gap areas.

14 Claims, 7 Drawing Sheets

(56) References Cited

U.S. PATENT DOCUMENTS

| | | |
|---|---|---|
| 5,176,729 A | 1/1993 | Bernard et al. |
| 5,277,706 A | 1/1994 | Blandin et al. |
| 5,474,590 A | 12/1995 | Lin |
| 5,582,841 A | 12/1996 | Watton et al. |
| 5,591,459 A | 1/1997 | Snyder |
| 5,785,996 A | 7/1998 | Snyder |
| 5,900,037 A | 5/1999 | Yang et al. |
| 5,987,928 A | 11/1999 | Bernard et al. |
| 6,128,929 A | 10/2000 | Peterson et al. |
| 6,167,729 B1 | 1/2001 | Watton et al. |
| 6,596,048 B1 | 7/2003 | Tuffal et al. |
| 6,990,837 B2 | 1/2006 | Skarzenski et al. |
| 7,003,987 B2 | 2/2006 | Skarzenski et al. |
| 8,087,265 B2 | 1/2012 | Gavin et al. |
| 2003/0203200 A1 | 10/2003 | Skarzenski et al. |
| 2006/0281622 A1 | 12/2006 | Maricourt et al. |
| 2009/0320528 A1 | 12/2009 | Skarzenski et al. |
| 2012/0270718 A1 | 10/2012 | Boulanov et al. |

FOREIGN PATENT DOCUMENTS

| | | |
|---|---|---|
| EP | 994079 | 4/2000 |
| JP | 2003252644 | 9/2003 |
| WO | 9804504 | 7/1997 |

OTHER PUBLICATIONS

European Patent Office, International Search Report and Written Opinion, PCT/US2015/043923, Knauf Insulation, Inc., Nov. 6, 2015, 11 pgs.

MULTI-COMPONENT ROTARY SPINNER APPARATUSES SYSTEMS AND METHODS FOR PRODUCING FIBER FROM MOLTEN MATERIAL

BACKGROUND

The present application relates generally to rotary spinner apparatuses, systems and methods for producing fibers from molten materials and more particularly but not exclusively to multi-component rotary spinners for the same. Rotary spinners are useful for producing fiber materials such as fiberglass, glass wool, rock wool, mineral wool, or mixtures thereof. The production process for such materials may include introducing molten glass, rock, minerals, slag and/or other thermoplastic compositions into a rotating spinner, passing the molten material through apertures in the spinner, impinging a stream of elevated temperature gas onto material exiting the spinner apertures to further attenuate the material into fibers, adding binder compositions to the gas/fiber stream, and cooling and collecting the resulting fiber material. Spinners utilized in such processes are exposed to harsh operating conditions including mechanical stressing, thermal stressing and corrosion such as hot corrosion or oxidation. The performance and service longevity of spinners is negatively impacted by these conditions. Compounding these difficulties, the materials from which rotary spinners are formed face a trade-off between strength and corrosion resistance such that compositions exhibiting greater strength offer lesser corrosion resistance and vice-versa. Conventional attempts to address these challenges suffer from a number of drawbacks, disadvantages and shortcomings. There remains a significant need for the unique apparatuses, systems and methods disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Unique rotary spinner apparatuses, systems and methods for producing fibers from molten materials are disclosed. Certain exemplary embodiments include rotary spinners including a hub, a slinger, an annular member, a retaining member, and a plurality of fasteners. In certain embodiments the hub, the retaining member, and the plurality of fasteners are structured to limit axial movement of the annular member relative to the hub member and to allow radial expansion and contraction of the annular member relative to the hub member. In certain embodiments the annular member is structured to contact the hub at a plurality of contact areas and is spaced apart from the hub at a plurality of gap areas. In certain embodiments the slinger is structured to contact the hub at a plurality of contact areas and is spaced apart from the hub at a plurality of gap areas. Further embodiments, forms, objects, features, advantages, aspects, and benefits shall become apparent from the following description and drawings.

DETAILED DESCRIPTION OF ILLUSTRATIVE EMBODIMENTS

Figure 1:
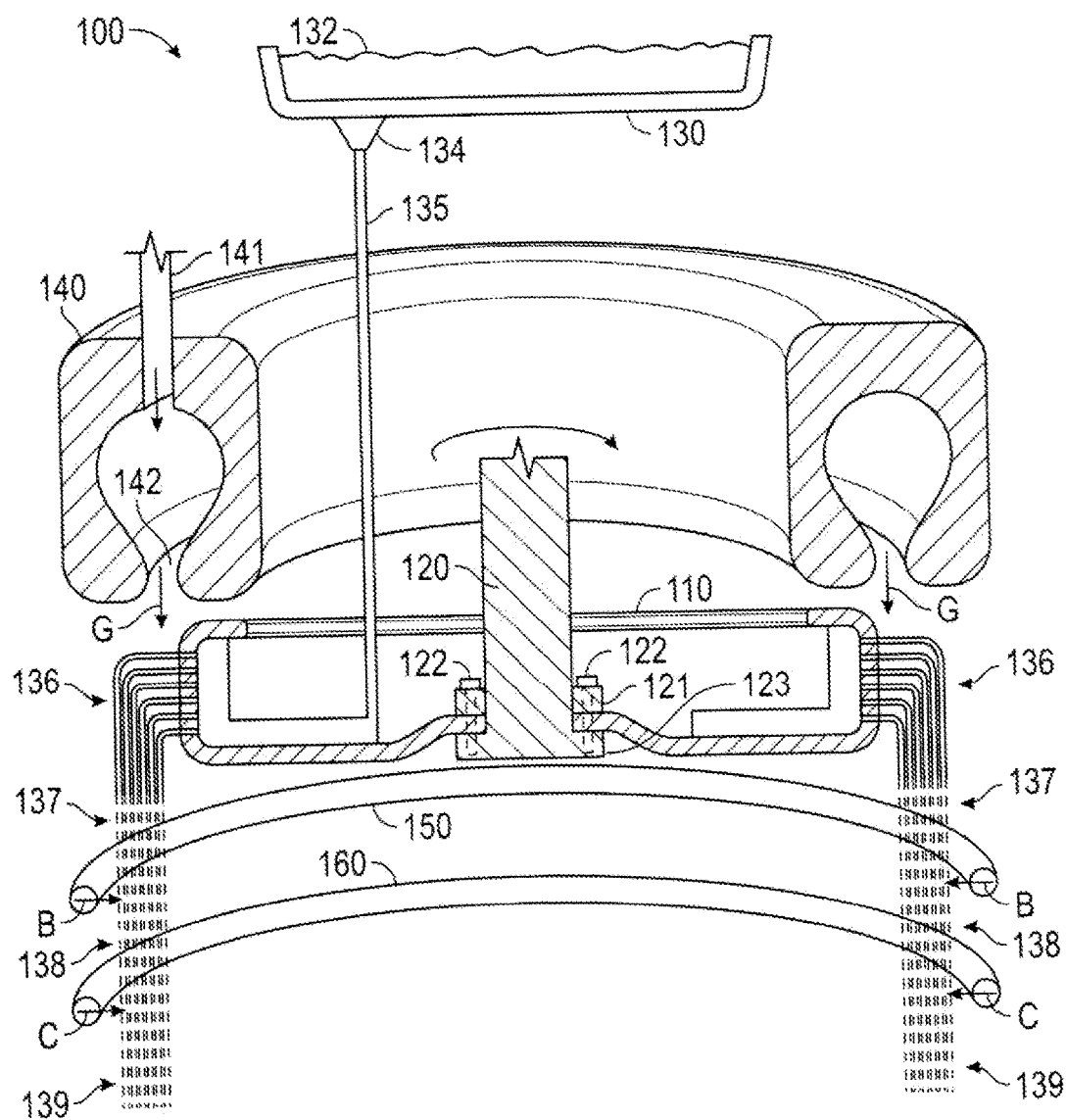
FIG. 1 illustrates an exemplary system for producing fibers from molten material.

With reference to FIG. 1 there is illustrated an exemplary system 100 for producing fibers from molten material. System 100 includes a spinner 110 which is coupled with a rotating shaft 120. In the illustrated embodiments spinner 110 is coupled with rotating shaft 120 by fastening bolts 122 which pass through apertures in ring member 121, spinner 110, and an upper flange portion 123 of rotating shaft 120 effective to clamp spinner 110 between flange 123 and ring member 121. It shall be appreciated that a variety of other coupling structures may be utilized to couple spinner 110 with rotating shaft 120 including, for example, alternate fastener arrangements, threaded connectors, spline connectors and other types of coupling structures. It shall further be appreciated that spinner 110 may be provided in a number of unique structural forms, exemplary embodiments of which are disclosed herein below in connection with FIGS. 2-9.

System 100 further includes a furnace 130 containing a supply of molten thermoplastic material 132. It shall be appreciated that a variety of molten thermoplastic materials may be utilized including for example glass, rock, other mineral compositions such as slags and basaltic materials, or mixtures thereof. A dispensing device 134 is connected to furnace 130 and dispenses a stream of molten material 135 to spinner 110. As spinner 110 is rotated by rotating shaft 120 centrifugal force acts on molten material 135 and forces it outward toward the side wall of spinner 110 and through a plurality of apertures formed in the side wall of spinner 110.

System 100 further includes a plenum 140 which receives a mixture of air and gas to be combusted from a supply 141 and outputs elevated temperature gas at annular outlet 142. Plenum 140 is structured to direct a stream of elevated temperature gas proximate the outer periphery of spinner 110 generally in the direction indicated by arrows G. Molten material exits the side wall of spinner 110 as a plurality of pre-fibers 136 which encounter the stream of elevated temperature gas provided by plenum 140. The pre-fibers 136 are entrained in the gas stream and are further attenuated into fibers 137. Fibers 137 travel in a downward direction through annular feed ring 150 which introduces a cooling material into the gas stream as generally indicated by arrows B to provide cooled fibers 138 entrained in the gas stream. The fiber/binder mixture 138 travels in a downward direction through annular feed ring 160 which introduces a binder material into the gas stream as generally indicated by arrows C to provide a cooled fiber/binder mixture 139 entrained in the gas stream. The cooled fiber/binder mixture 139 continues to travel in the downward direction where it is collected and may be further processed for forming fiber-based materials such as fiber glass, rock wool, or mineral wool materials and structures composed thereof.

During operation of system 100 the spinner 110 may experience substantial thermal stress. In certain embodiments the high temperature portions of the spinner 110 may be at least 2000 degrees F. In certain embodiments used in connection with molten glass the high temperature portions of the spinner 110 may range from 1700 degrees F. to 2100 degrees F. or various points therebetween. In certain embodiments used in connection with molten slag or molten basaltics the high temperature portions of the spinner 110 may range from 2000 degrees F. to 2300 degrees F. or various points therebetween. In certain embodiments used in connection with molten rock compositions the high temperature portions of the spinner 110 may range from 2100 degrees F. to 2400 degrees F. or various points therebetween. Such high temperature portions may be present in the side wall of the spinner 110 and in particular, though not exclusively, at or near the intersection of the side wall and the lower wall, or at or near the intersection of the side wall and the upper wall or flange proximate the stream of elevated temperature gas directed from the plenum 140. The thermal gradient experienced by the spinner 110 may also be substantial. In certain embodiments the low temperature portions of the spinner 110 may range from 800 degrees F. to 900 degrees F. or various points therebetween. These low temperatures portions may be present in the lower wall or base of spinner 110 in particular, though not exclusively adjacent the coupling with shaft 120. The thermal gradient experienced by the spinner may range from any of the temperatures of the aforementioned high temperature portions to any of the temperatures of the aforementioned low temperature portions. It shall be appreciated that the exemplary temperatures and ranges disclosed herein are non-limiting examples of the thermal conditions which may be experienced by spinner 110. A variety of other temperature conditions may also be experienced, including higher temperatures, lower temperatures, larger temperature gradients and smaller temperature gradients.

Figure 2:
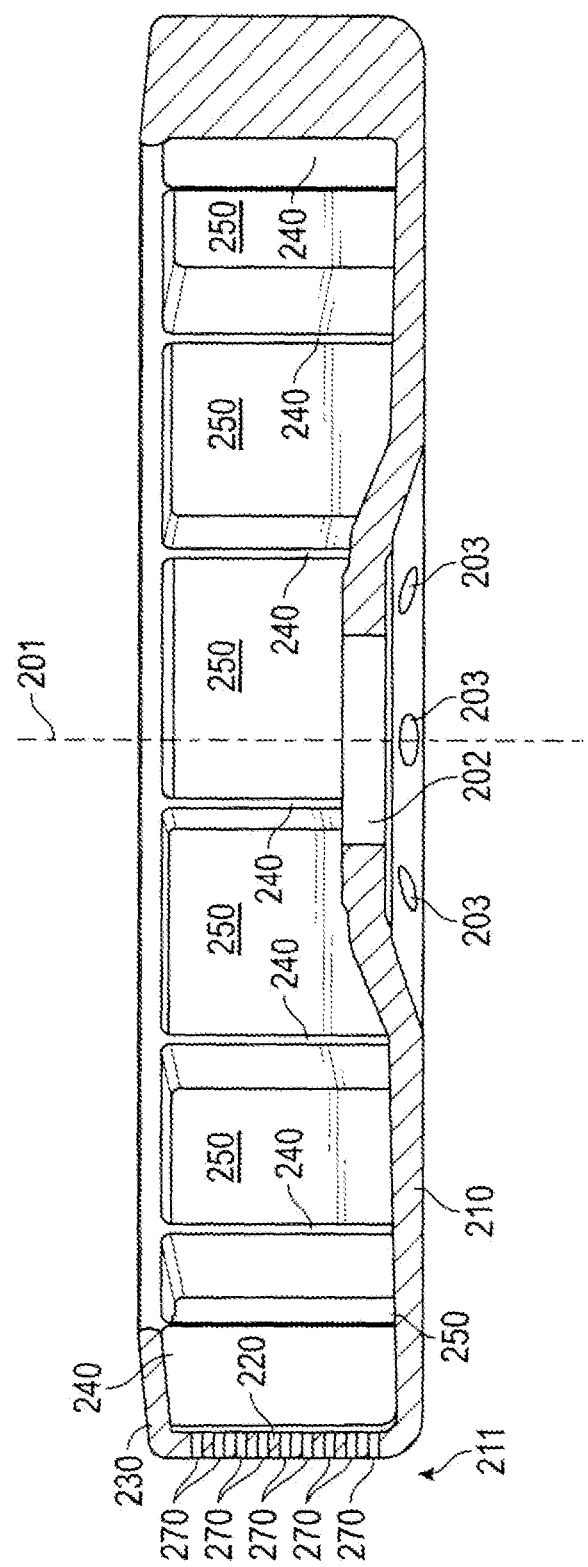
FIG. 2 illustrates a side sectional view of an exemplary rotary spinner.
Figure 3:
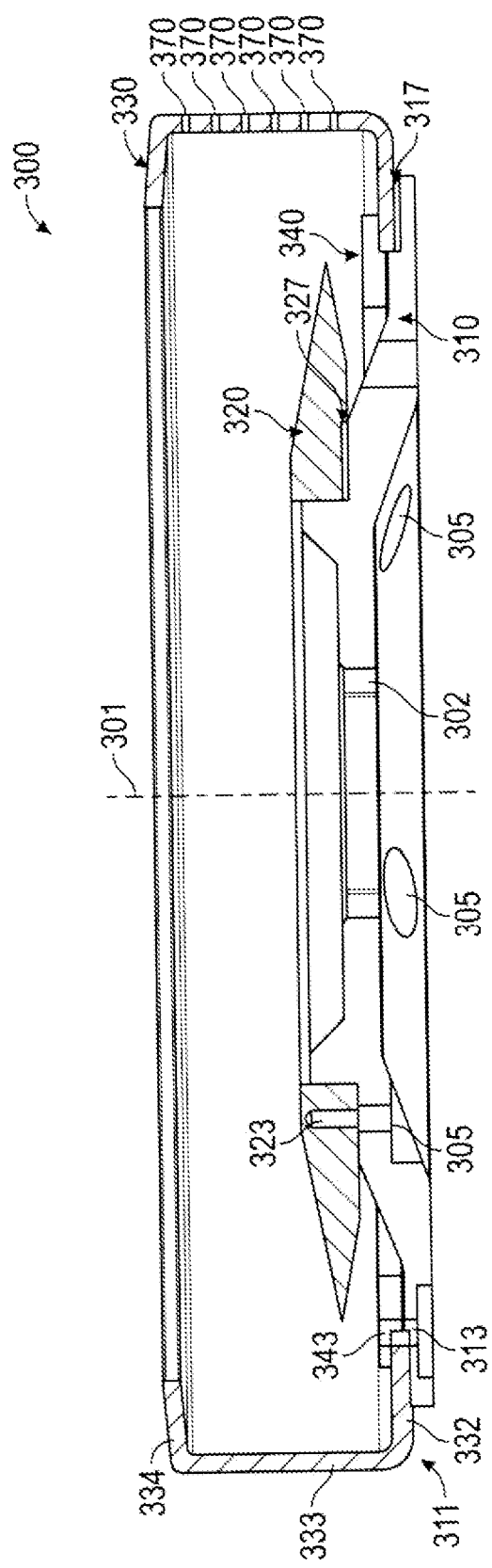
FIG. 3 illustrates a side sectional view of another exemplary rotary spinner.
Figure 4:
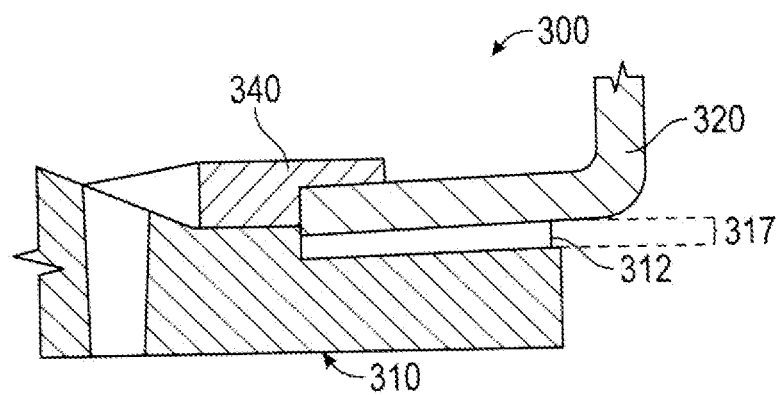
FIG. 4 illustrates a partial side sectional view the exemplary spinner of FIG. 3.
Figure 5:
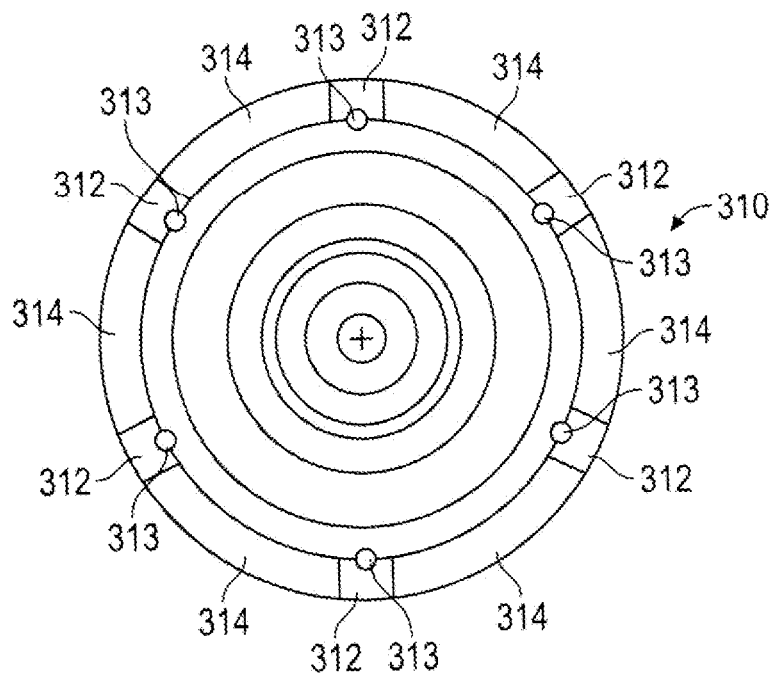
FIG. 5 illustrates a top view of a hub member of the exemplary spinner of FIG. 3.
Figure 6:
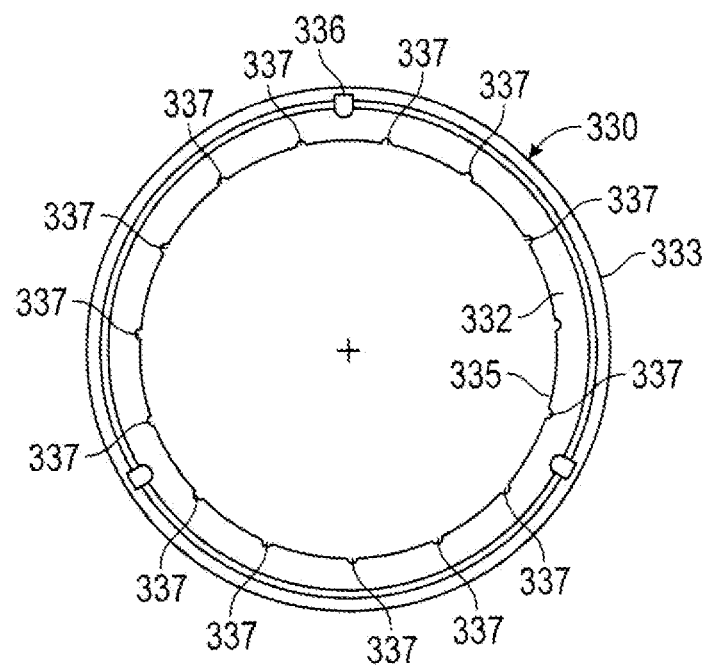
FIG. 6 illustrates a bottom view of an annular member of the spinner of FIG. 3.
Figure 7:
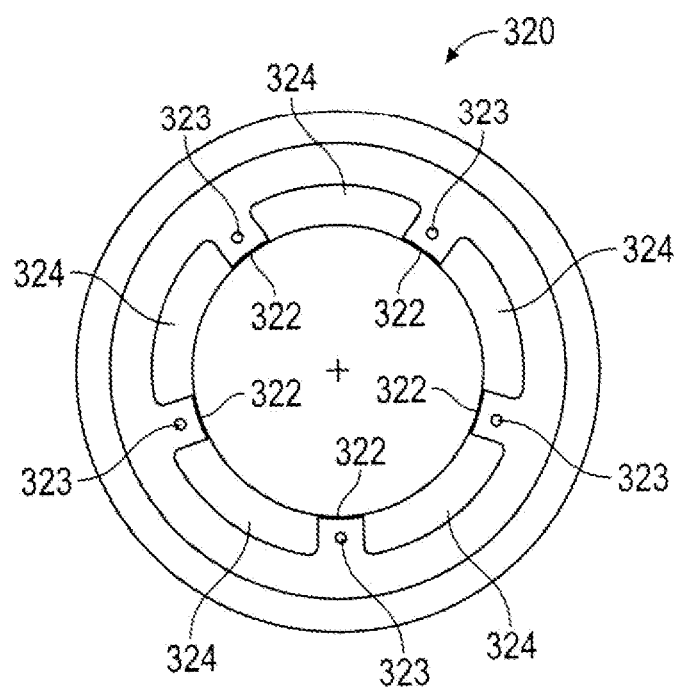
FIG. 7 illustrates a bottom view of a slinger plate of the exemplary spinner of FIG. 3.

With reference to FIG. 2 there is illustrated a spinner 200 which may be provided as one exemplary form of spinner 110 described above in connection with FIG. 1. Spinner 200 includes a base 210 extending radially outward from central axis 201 to a substantially circular periphery 211, a side wall 220 extending about the circular periphery 211 in an axially upward direction from the base 210, and an upper flange 230 extending radially inward from the side wall 220. Spinner 200 further includes a plurality of gussets 240 extending radially inward from the side wall 220 and extending axially from the base 210 to the upper flange 220. It shall be appreciated that in various embodiments, upper flange 220 may extend radially inward past gussets 240, may extend radially inward over only part of the radial distance of gussets 240, or may be substantially co-extensive with the radial and circumferential extent of side wall 220 such that the top of spinner 210 is substantially open.

The interior surfaces of spinner 200 define a plurality of pockets 250 bounded by surfaces of the base 220, the side wall 230, the flange 230, and respective pairs of the plurality of gussets 240. The pockets 250 open inwardly to a central structural void which extends across substantially the entire interior region of spinner 200. A plurality of apertures 270 (only a few of which are depicted for clarity and simplicity of illustration) extend through the portions of the sidewall 220 bounding the plurality of pockets 250 and may be formed, for example, by mechanical drilling, laser drilling or other techniques. A central aperture 202 and a plurality of vent holes 203 are formed in spinner 200 and are structured to receive a rotating shaft and associated connection structures, such as those illustrated above in connection with FIG. 1.

In the illustrated embodiment, spinner 200 is structured as a substantially net-shaped single-pattern casting including base 210, side wall 220, upper flange 230, and gussets 240. It shall be appreciated that a substantially net shaped single-pattern casting refers to a casting structure that is formed as a unitary piece through a casting process utilizing a single casting pattern and that may be further processed, for example, to balance the cast structure for subsequent rotation, remove structural artifacts or undesired features of the casting process such as rough surfaces or edges, and to form apertures such as apertures 270 or other types of extrusion apertures as well as fastener apertures. It shall further be appreciated that the term substantially net shape single-pattern casting describes distinctive structural characteristics of the spinner 200.

With reference to FIGS. 3-7 there are illustrated several views of a spinner 300 and portions thereof. Spinner 300 is one exemplary form of spinner 110 described above in connection with FIG. 1. Spinner 300 includes a hub 310 extending radially outward relative to a central axis 301, an annular member 330 which overlaps with a portion of hub 310 and extends further radially outward, a slinger 320 positioned above hub 310 and extending radially outward toward annular member 330, and a retaining member 340 positioned above a portion of hub 310 and a portion of annular member 330. It shall be appreciated that hub 310, annular member 330 and retaining member 340 may be positioned in other configurations including, for example, with the annular member 330 positioned below hub 310 and retaining member positioned below hub 310 and annular member 330.

Annular member 330 includes a lower wall 332 extending radially outward, a side wall 333 extending axially upward from the lower wall 332, and an upper wall 334 extending radially inward from the side wall 333. A plurality of apertures 370 (only a few of which are depicted for clarity and simplicity of illustration) are formed in the side wall 333. A first side of the lower wall 332 contacts the hub 310. The illustrated embodiment depicts a preferred form in which a first side of lower wall 332 contacts the hub 310 at a plurality of contact areas 312, and lower wall 332 is spaced apart from the hub 310 at a plurality of gap regions 317 which are provided by recess portions 314 intermediate the plurality of contact areas 312. In other forms, the first side of the lower wall 332 may contact the hub 310 at a contact area without including gap regions.

In the illustrated embodiment contact areas 312 are structured as raised portions of hub 310 which extend upward relative to recess portions 314 of hub 310 and are distributed about the periphery of hub 310. It shall be appreciated that corresponding raised portions and recess portions may be provided in the surface of lower wall 332 of annular member 330 which faces the hub 310 as an alternative to or in addition to providing the contact areas and recess portions of the illustrated embodiment. It shall be further appreciated that the illustrated pattern of raised portions and recess portions is but one non limiting example and that multiple additional forms are contemplated, further non-limiting examples of which shall now be described. It shall also be appreciated that in various embodiments, upper wall 334 may extend radially inward a greater or lesser amount than the illustrated embodiment or be substantially co-extensive with the radial and circumferential extent of side wall 333 such that the top of spinner 310 is substantially open.

In certain additional forms the raised portions and recess portions may be provided in concentric ring patterns including one or more raised ring areas and one or more recessed ring areas. In some forms inner and outer concentric raised areas may be separated by intermediate recessed areas. In some forms the raised ring areas may be continuous. In other forms the raised ring areas may be intermittent or separated. In further forms the raised portions may be post-shaped projections extending above adjacent or surrounding recessed portions. In a further additional example the raised portions may be hemispherical or lobe-shaped projections resembling bumps extending above adjacent or surrounding recessed portions. Additional examples may use different numbers of raised portions and recess portions, differently positioned or differently angled raised portions and recess portions, differently shaped raised portions and recess portions, and/or differently distributed raised portions and recess portions.

Regardless of the particular structural configuration utilized, the raised portions and recess portions of the hub 310 and/or the annular member 330 are structured to provide support of annular member 330 by hub 310 while providing reduced contact surface area between the overlapping portions of the annular member 330 and the hub 310. In exemplary embodiments the reduced contact surface area provides reduced heat transfer from the annular member 330 to the hub 310.

A plurality of fasteners (not illustrated) are inserted through fastener apertures 313 formed in hub 310 and a plurality of apertures 343 formed in retaining member 340 to couple retaining member 340 and hub 310. In an exemplary form the fasteners may be threaded bolts which engage mating threads formed in apertures 343 of retaining member 340. A variety of other fastener structures may also be utilized. In the illustrated embodiment the fasteners also pass through respective ones of recesses 337 formed in the inner periphery 335 of lower wall 332 of annular member 330. In this configuration the fasteners may impart rotational force from the hub to the annular member causing it to rotate with the hub 310 while still allowing the annular member 330 to move relative to hub 310 such as may occur during thermal expansion of the annular member 330.

In the illustrated embodiment the retaining member 340, the hub 310 and the fasteners connecting these two structures are configured to contact overlapping portions of annular member 330 while imparting a substantially zero clamping force on the annular member 330. This configuration accommodates movement of the annular member relative to the hub 310 and the clamping member 340 with predetermined stress transfer characteristics between these structures that are substantially zero over a certain range of expansion where annular member 330 moves freely relative to hub 310 in a radial direction. In other embodiments the retaining member 340, the hub 310 and the fasteners connecting these two structures may be configured to impart a non-zero positive clamping force on the annular member 330. The clamping force may be selected to accommodate varying predetermined degrees of movement with varying predetermined stress transfer characteristics between these structures depending on the requirements of different applications. In further embodiments the retaining member 340 may be spaced apart from the annular member 330 while still fixedly coupled with hub 310 to accommodate even greater movement of annular member 330 relative to hub 310 and retaining member 330.

Slinger 320 contacts the hub 310 at a plurality of contact areas 322 and is spaced apart from the hub 310 at a plurality of gap regions 327 which are provided by recess portions 324 intermediate the plurality of contact areas 322. In further embodiments, slinger 320 may contact hub 310 at a contact area without the presence of gap regions. A plurality of fasteners (not illustrated) may be introduced through fastener apertures 305 of hub 310 and fastener apertures 323 of slinger 320. In an exemplary form the fasteners may be threaded bolts which engage mating threads formed in apertures 323. A variety of other fastener structures may also be utilized.

In the illustrated embodiment contact areas 322 are structured as raised portions of slinger 320 which extend outward relative to recess portions 324 of slinger 320 and are distributed about slinger 320 in the illustrated pattern. It shall be appreciated that corresponding raised portions and recess portions may be provided in the surface of hub 310 which faces the slinger 320 as an alternative to or in addition to providing the contact areas and recess portions of the illustrated embodiment. It shall be further appreciated that the illustrated pattern of raised portions and recess portions is but one non limiting example and that multiple additional forms are contemplated. These additional forms may include structures which are the same as or similar to the further non-limiting examples described above in connection with the raised and recessed portions of the interface between the hub 310 and the annular member 330.

Figure 8:
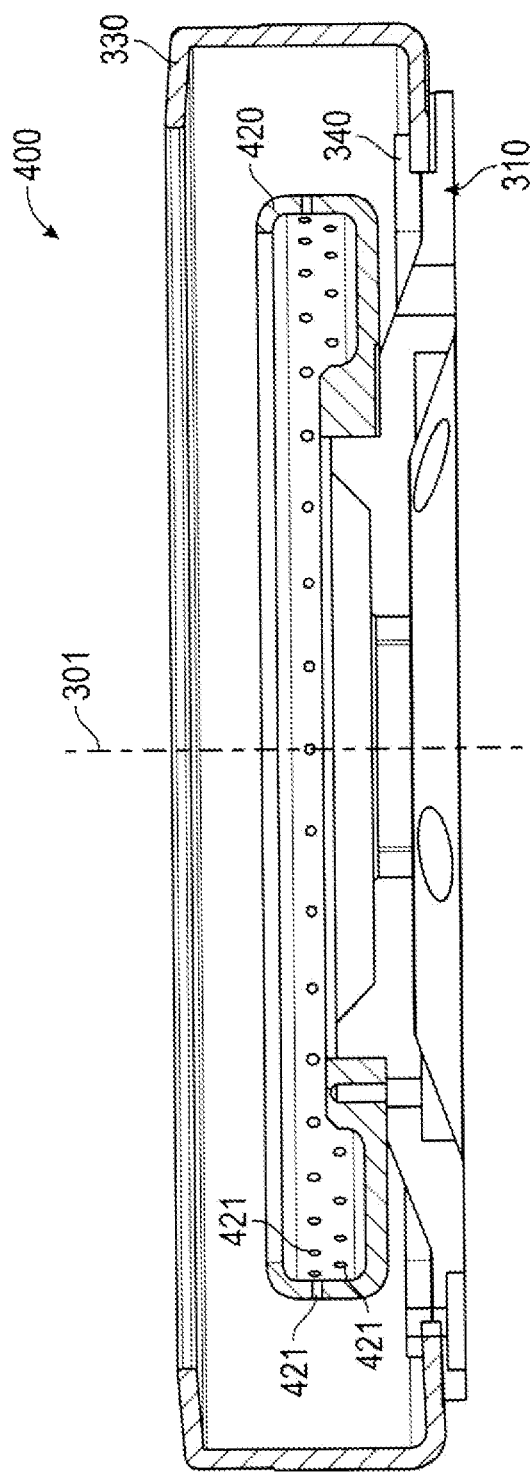
FIG. 8 illustrates a sectional view of another exemplary spinner.
Figure 9:
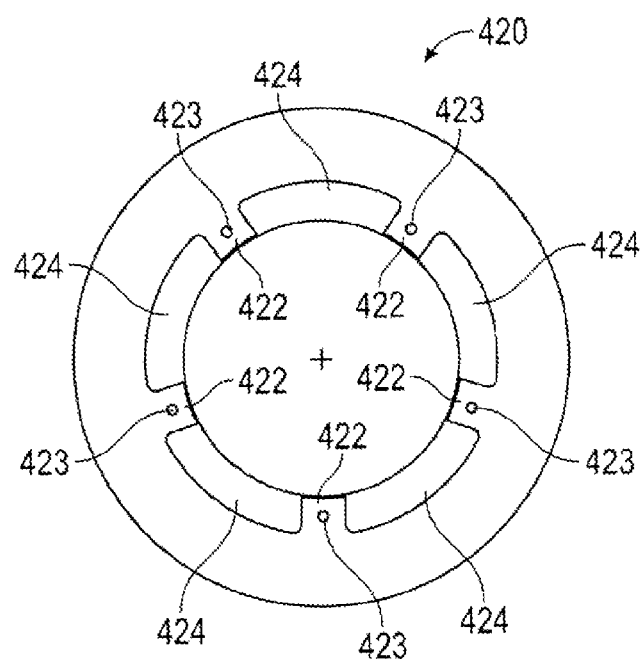
FIG. 9 illustrates a bottom view of a slinger basket of the spinner of FIG. 8.

With reference to FIGS. 8 and 9 there are illustrated several views of a spinner 400 and portions thereof. Spinner 400 is one exemplary form of spinner 110 described above in connection with FIG. 1. Spinner 400 includes a hub 310 extending radially outward relative to a central axis 301, an annular member 330 which overlaps with a portion of hub 310 and extends further radially outward, and a retaining member 340 positioned above a portion of hub 310 and a portion of annular member 330. Further details of these structures are described above in connection with the slinger 300 illustrated in FIGS. 3-7. Spinner 400 further includes a cup shaped slinger 420 including a plurality of holes 421 in its side wall positioned above hub 310 and extending radially outward toward annular member 330.

Slinger 420 contacts the hub 310 at a plurality of contact areas 422 and is spaced apart from the hub 310 at a plurality of gap regions which are provided by recess portions 424 intermediate the plurality of contact areas 422. In further embodiments, slinger 420 may contact hub 410 at a contact area without the presence of gap regions. In the illustrated embodiment contact areas 422 are structured as raised portions of slinger 420 which extend outward relative to recess portions 424 of slinger 420 and are distributed about slinger 420 in the illustrated pattern. It shall be appreciated that corresponding raised portions and recess portions may be provided in the surface of hub 310 which faces the slinger 420 as alternative to or in addition to providing the contact areas and recess portions of the illustrated embodiment. It shall be further appreciated that the illustrated pattern of raised portions and recess portions is but one non limiting example and that multiple additional forms are contemplated. These additional forms may include structures which are the same as or similar to the further non-limiting examples described above in connection with the raised and recessed portions of the interface between the hub 310 and the annular member 330.

Figure 10:
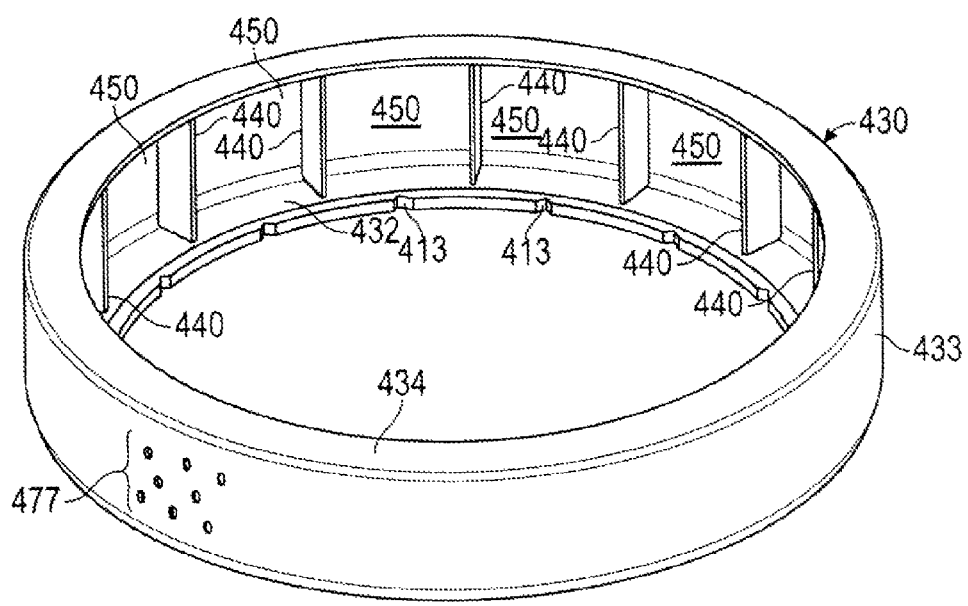
FIG. 10 illustrates a perspective view of another exemplary annular member.

With reference to FIG. 10 there is illustrated an additional annular member 430 which may be utilized in connection with spinner 300 or spinner 400 in place of annular member 330. Annular member 430 includes a lower wall 432 extending radially outward, a side wall 433 extending axially upward from the lower wall 432, and an upper wall 434 extending radially inward from the side wall 433. The interior surfaces of annular member 430 define a plurality of pockets 450 bounded by surfaces of the lower wall 432, the side wall 433, the upper wall 434, and respective pairs of the plurality of gussets 440. The pockets 450 open inwardly. A plurality of apertures 477 (only a few of which are depicted for clarity of illustration) extend through the portions of the sidewall 433 bounding the plurality of pockets 550 and may be formed, for example, by mechanical drilling, laser drilling or other techniques. Annular member 430 also includes a plurality of recesses 413 which may be structured and function similar to recesses 337 described above in connection with spinner 300. It shall be appreciated that in various embodiments, upper wall 434 may extend radially inward a greater or lesser amount than the illustrated embodiment or be substantially co-extensive with the radial and circumferential extent of side wall 433 such that the top of spinner 410 is substantially open.

In the illustrated embodiment, spinner 400 is structured as a substantially net-shaped single-pattern casting including lower wall 432, side wall 433, upper wall 434, and gussets 440. As noted above, it shall be appreciated that a substantially net shaped single-pattern casting refers to a cast structure that is formed as a unitary piece through a casting process utilizing a single casting pattern and that may be further processed, for example, to balance the cast structure for subsequent rotation, remove structural artifacts of the casting process such as rough surfaces or edges, and form apertures such as extrusion apertures and fastener apertures. It shall further be appreciated that the term substantially net shape single-pattern casting describes distinctive structural characteristics of the annular member 430.

It shall be appreciated that the apparatuses, systems and methods disclosed herein permit the formation of rotary spinner structures from existing alloys previously found to offer inadequate performance and/or inadequate durability under certain operating conditions such as those disclosed herein. Such exemplary alloy materials include a number of steel alloys as well as Co-based, Fe-based, Cr-based, and Ni-based superalloys including for example FSX-414, HS-21, X-45, F-75, and IN-625. Such alloys may be utilized to form structures such as spinner 200, annular member 330, annular member 430, slinger 320 and slinger 420 among other structures. It shall be appreciated that the foregoing and similar materials exhibit creep or elevated tensile strength that makes them undesirable or unsuited for temperature operation above about 2000 degrees F.

A number of non-limiting exemplary embodiments and forms shall now be further described. Certain exemplary embodiments include rotary spinner apparatus for producing fibers from molten material comprising a hub member extending radially outward relative to a central axis and being rotatable about the central axis, an annular member including a lower wall extending radially outward, a side wall extending axially upward from the lower wall, and an upper wall extending radially inward from the side wall, a first side of the lower wall contacting the hub member, a plurality of apertures being formed in the side wall, a retaining member facing a second side of the lower wall, a plurality of fasteners coupling the retaining member and the hub member, and a slinger member positioned radially inward from the annular member and extending radially outward toward the annular member, the slinger member contacting the hub member.

The embodiments including a rotary spinner apparatus may be provided in a number of forms. In certain forms, the retaining member, the hub member and the plurality of fasteners are structured to limit axial movement of the annular member relative to the hub member and are structured to allow radial expansion and contraction of the annular member relative to the hub member. In certain forms the first side of the lower wall contacts the hub member at a plurality of contact areas and is spaced apart from the hub member at a plurality of gap regions intermediate the plurality of contact areas. In certain forms the plurality of gap regions are provided by recesses defined in the hub member. In certain forms the slinger member contacts the hub member at a second plurality of spaced apart contact areas and is spaced apart from the hub member at a second plurality of gap regions intermediate the second plurality of contact areas. In certain forms the second plurality of gap regions are provided by recesses defined in the slinger member. In certain forms the plurality of fasteners are positioned to extend through a respective plurality of recesses defined in an inner periphery of the lower wall. In certain forms, the slinger member is structured as a cup including a plurality of holes defined in a side portion of the cup. In certain forms the singer member is a disc shaped member. In certain forms the retaining member and the hub member apply a clamping force on the lower wall of the annular member. In certain forms the annular member comprises a plurality of gussets extending radially inward from the side wall and axially upward from the lower wall to the upper wall. Certain forms further comprise a shaft coupled with the hub member, the shaft extending along and being rotatable about the central axis, a dispensing member structured to direct a stream of molten material in a downward direction to contact the slinger member, and a plenum structured to direct a stream of elevated temperature gas toward an exterior surface of the annular member. In certain forms the annular member and the slinger are formed of one of a Ni-based superalloy, Fe-based superalloy, Cr-based superalloy, and a Co-based superalloy, and the hub is formed of stainless steel.

Certain exemplary embodiments include a method for producing fibers from molten material comprising rotating a spinner about a central axis, the spinner including a hub extending radially relative to the central axis, an annular member including a base portion extending radially relative to the central axis, a side portion extending axially upward from the base portion and having a plurality of apertures extending from an interior surface of the annular member to an exterior surface of the annular member, and an upper portion extending radially inward from the side portion, the base portion contacting the hub, a retainer facing a second side of the base portion, a plurality of fasteners coupling the retainer and the hub, and a slinger positioned radially inward from the annular member and extending radially outward toward the annular member, the slinger contacting the hub, directing a stream of molten material onto the slinger, directing molten material from the slinger to the annular member through rotation of the slinger, directing molten material through the plurality of apertures of the side portion through rotation of the annular member, and directing a stream of elevated temperature gas toward the molten material exiting the apertures effective to attenuate the molten material into fibers.

The embodiments including a method for producing fibers from molten material may be provided in a number of forms. In certain forms the annular member moves relative to the hub due to thermal expansion during operation. In certain forms the base portion contacts the hub at a plurality of contact areas adjacent a plurality of gap regions where the base portion does not contact the hub, and the slinger contacts the hub at a second plurality of spaced apart contact areas and is spaced apart from the hub at a second plurality of gap regions where the slinger does not contact the hub. In certain forms at least a portion of the annular member is heated to at least 1800 degrees F. during operation. In certain forms at least a portion of the annular member is heated to at least 2000 degrees F. during operation. In certain forms the slinger moves relative to the hub due to thermal expansion during operation. In certain forms the fasteners apply rotational force to the annular member during operation. In certain forms the rotational force is applied to the annular member at a plurality of recesses formed in the lower portion. In certain forms the retainer and the hub apply a clamping force to the base portion of the annular member during operation. In certain forms the clamping force is selected to accommodate a predetermined magnitude of thermal expansion of the annular member. In certain forms the predetermined magnitude of thermal expansion of the annular member is between about 0.5% and 2.5% from ambient in at least one dimension.

Certain exemplary embodiments include a system for producing fibers from molten material comprising a shaft extending along and being rotatable about an axis, a spinner coupled with and rotatable with the shaft, the spinner including a hub, an annular member including a lower portion extending radially outward relative to the axis, a side portion extending axially upward from the lower portion and including a plurality of apertures, and an upper portion extending radially inward from the side portion, the hub contacting the lower portion at a plurality of contact areas and being spaced apart from the hub at a plurality of gap areas, and a retaining member facing a second side of the lower portion, a dispensing member structured to direct a stream of molten material in a downward direction to the spinner, and a plenum structured to direct a stream of elevated temperature gas toward a surface of the spinner.

The embodiments including a system for producing fibers from molten material may be provided in a number of forms. In certain forms the plurality of gap areas are provided by recesses defined in the hub. Certain forms further comprise a slinger positioned radially inward from the annular member, the slinger contacting the hub at a second plurality of spaced apart contact areas and being spaced apart from the hub at a second plurality of gap areas. In certain forms the second plurality of gap areas are provided by recesses defined in the slinger. Certain forms further comprise a plurality of fasteners coupling the retaining member and the hub member and positioned to extend through a respective plurality of recesses defined in the lower portion. In certain forms the retaining member and the hub apply a clamping force to the lower portion. In certain forms the annular member comprises a plurality of gussets extending radially inward from the side portion and axially upward from the lower portion to the upper portion.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A rotary spinner apparatus for producing fibers from molten material comprising:
   a hub member extending radially outward relative to a central axis and being rotatable about the central axis;
   an annular member including a lower wall extending radially outward, a side wall extending axially upward from the lower wall, and an upper wall extending radially inward from the side wall, a first side of the lower wall contacting the hub member, a plurality of apertures being formed in the side wall;
   a retaining member facing a second side of the lower wall;
   a plurality of fasteners coupling the retaining member and the hub member, the retaining member, the hub member and the plurality of fasteners structured to limit axial movement of the annular member relative to the hub member and structured to allow radial expansion and contraction of the annular member relative to the hub member; and
   a slinger member positioned radially inward from the annular member and extending radially outward toward the annular member, the slinger member contacting the hub member;
   wherein the slinger member contacts the hub member at a second plurality of spaced apart contact areas and is spaced apart from the hub member at a second plurality of gap regions intermediate the second plurality of contact areas.

2. The apparatus of claim 1 further comprising:
   a shaft coupled with the hub member, the shaft extending along and being rotatable about the central axis;
   a dispensing member structured to direct a stream of molten material in a downward direction to contact the slinger member; and
   a plenum structured to direct a stream of elevated temperature gas toward an exterior surface of the annular member.

3. The apparatus of claim 1 wherein the first side of the lower wall contacts the hub member at a plurality of contact areas and is spaced apart from, the hub member at a plurality of gap regions intermediate the plurality of contact areas.

4. The apparatus of claim 3 wherein the plurality of gap regions are provided by recesses defined in the hub member.

5. The apparatus of claim 1 wherein the plurality of fasteners are positioned to extend through a respective plurality of recesses defined in an inner periphery of the lower wall.

6. The apparatus of claim 1 wherein the retaining member and the hub member apply a clamping force on the lower wall of the annular member.

7. The apparatus of claim 1 wherein the annular member comprises a plurality of gussets extending radially inward from the side wall and axially upward from the lower wall to the upper wall.

8. A rotary spinner apparatus for producing fibers from molten material comprising:
- a hub member extending radially outward relative to a central axis and being, rotatable about the central axis;
- an annular member including a lower wall extending radially outward, a side wall extending axially upward from the lower wall, and an upper wall extending radially inward from the side wall, a first side of the lower wall contacting the hub member, a plurality of apertures being formed in the side wall;
- a retaining member facing a second side of the lower wall;
- a plurality of fasteners coupling the retaining member and the hub member, the retaining member, the hub member and the plurality of fasteners structured to limit axial movement of the annular member relative to the hub member and structured to allow radial expansion and contraction of the annular member relative to the hub member; and
- a slinger member positioned radially inward from the annular member and extending radially outward toward the annular member, the slinger member contacting the hub member;

wherein second plurality of gap regions are provided by recesses defined in the slinger member.

9. The apparatus of claim 8 further comprising:
- a shaft coupled with the hub member, the shaft extending along and being rotatable about the central axis;
- a dispensing member structured to direct a stream of molten material in a downward direction to contact the slinger member; and
- a plenum structured to direct a stream of elevated temperature gas toward an exterior surface of the annular member.

10. The apparatus of claim 8 wherein the first side of the lower wall contacts the hub member at a plurality of contact areas and is spaced apart from the hub member at a plurality of gap regions intermediate the plurality of contact areas.

11. The apparatus of claim 10 wherein the plurality of gap regions are provided by recesses defined in the hub member.

12. The apparatus of claim 8 wherein the plurality of fasteners are positioned to extend through a respective plurality of recesses defined in an inner periphery of the lower wall.

13. The apparatus of claim 8 wherein the retaining member and the hub member apply a clamping force on the lower wall of the annular member.

14. The apparatus of claim 8 wherein the annular member comprises a plurality of gussets extending radially inward from the side wall and axially upward from the lower wall to the upper wall.

* * * * *